United States Patent [19]

Churchill et al.

[11] Patent Number: 5,352,090

[45] Date of Patent: Oct. 4, 1994

[54] SYSTEM FOR DETERMINING AERODYNAMIC IMBALANCE

[75] Inventors: Gary B. Churchill, San Jose; Benny K. Cheung, San Francisco, both of Calif.

[73] Assignee: The United States of America as represented by the Administrator of the National Aeronautics and Space Administration, Washington, D.C.

[21] Appl. No.: 926,117

[22] Filed: Aug. 7, 1992

[51] Int. Cl.⁵ ............................................... B64C 11/00
[52] U.S. Cl. ........................................... 416/61; 416/34
[58] Field of Search ................................ 416/34, 35, 61

[56] References Cited

U.S. PATENT DOCUMENTS

| | | | |
|---|---|---|---|
| 3,938,762 | 2/1976 | Murphy | 73/462 |
| 4,041,775 | 8/1977 | McNamee | 73/70.2 |
| 4,345,237 | 8/1982 | Lerche et al. | 416/61 |
| 4,463,453 | 7/1984 | Cohen et al. | 367/135 |
| 4,513,619 | 4/1985 | Widdall | 73/455 |
| 4,524,620 | 6/1985 | Wright et al. | 73/587 |
| 4,922,757 | 5/1990 | Rozelle et al. | 416/61 |

FOREIGN PATENT DOCUMENTS

| | | | |
|---|---|---|---|
| 0735931 | 5/1980 | U.S.S.R. | 416/61 |
| 2137153 | 10/1984 | United Kingdom | 416/61 |

Primary Examiner—Edward K. Look
Assistant Examiner—Mark Sgantzos
Attorney, Agent, or Firm—Guy M. Miller; John G. Mannix; Alan J. Kennedy

[57] ABSTRACT

A system is provided for determining tracking error in a propeller or rotor driven aircraft by determining differences in the aerodynamic loading on the propeller or rotor blades of the aircraft. The system includes a microphone disposed relative to the blades during the rotation thereof so as to receive separate pressure pulses produced by each of the blades during the passage thereof by the microphone. A low pass filter filters the output signal produced by the microphone, the low pass filter having an upper cut-off frequency set below the frequency at which the blades pass by the microphone. A sensor produces an output signal after each complete revolution of the blades, and a recording display device displays the outputs of the low pass filter and sensor so as to enable evaluation of the relative magnitudes of the pressure pulses produced by passage of the blades by the microphone during each complete revolution of the blades.

14 Claims, 2 Drawing Sheets

SYSTEM FOR DETERMINING AERODYNAMIC IMBALANCE

ORIGIN OF THE INVENTION

The invention described herein was made by employees of the United States Government and may be manufactured and used by or for the government for governmental purposes without the payment of any royalties thereon or therefor.

BACKGROUND OF THE INVENTION

1. Technical Field of the Invention

The invention relates to a system for determining differences in aerodynamic loading of the rotor blades of helicopter and like aircraft to aid in providing acceptable rotor tracking and balance during flight.

2. Description of the Prior Art

Systems now used in addressing the problem of providing acceptable "track and balance" during flight measure the effects of blade loading differences by measuring resulting blade displacements rather than providing measurements with respect to the cause of the displacement. In this regard, a pilot recognizes a typical helicopter track and balance problem simply as an unacceptable rotor induced vibration. The "track and balance" problem is caused by imbalances in the rotor system in the mass and/or aerodynamic characteristics of the system, and there is at this time no way to discriminate between the effects of mass imbalance and aerodynamic imbalance. Presently, the existence of aerodynamic imbalance can presently only be demonstrated by nulling vibration of the rotor by providing mass balance and then providing measurement of blade displacements due to changes in aerodynamic imbalance. Nulling of the rotor vibration involves controlling the rotor r.p.m. and changing the mass balance of the rotors until vibration or shaking is no longer experienced. The blade position or displacement is read in space using conventional techniques (e.g., a strobe light). The process of providing "track and balance" is thus a lengthy and iterative one.

Patents of interest in this general field include the following: U.S. Pat. No. 3,938,762 (Murphy); U.S. Pat. No. 4,041,775 (McNamee); U.S. Pat. No. 4,463,453 (Cohen, et al); U.S. Pat. No. 4,513,619 (Widdall); and U.S. Pat. No. 4,524,620 (Wright, et al).

Briefly considering these patents, the Murphy patent discloses a sensing system for detecting a state of imbalance in a helicopter rotor blade. This system makes use of a vibration signal which represents the magnitude and phase of the imbalance. A difference signal is generated which is used for dynamic counterbalancing of the blade so as to eliminate tracking errors. The McNamee patent discloses a vibration meter tuned to resonate at known frequencies for known sources of vibration or the like in aircraft. Multiple sensors are provided for each of three dimensions. The occurrence of a resonance condition in the complex vibration environment is identified and isolated. The Cohen, et al patent discloses the use of dual microphones in an apparatus detecting acoustic energy. The apparatus utilizes a sound absorbing blanket in the vicinity of the microphones to filter out ambient noise. The apparatus is used to detect and identify undesirable vibration sources in aircraft. The Widdall patent discloses dual vibration sensing transducers used in providing an input to a pulse shaping circuit. The output of the latter is in turn fed to a phase comparator, then filtered. The phase shift of the signal is displayed on a voltage meter. The system is used to test balance of a rotatable member, such as in an aircraft. The Wright, et al patent discloses a system for the detection of acoustic emissions from replaceable rotor blades of a helicopter in order to monitor the aging of the blades in flight. The object of the system is to obtain the maximum useful life of the blades before replacement.

SUMMARY OF THE INVENTION

In accordance with the invention, a system and method are provided which enable immediate identification of aerodynamic imbalance independently of mass imbalance. The invention provides for measuring track error by determining discrepancies or inconsistencies in the lift provided by each blade of the rotors (propellers) of an aircraft and, in particular, for measuring or determining such inconsistencies in lift by measuring the differences in the pressure pulses produced by the individual blades using a pressure sensor. To briefly explain, the operation of the system of the invention is based on the fact that an airfoil travelling past a point produces a pressure pulse at that point and that the magnitude of that pressure pulse is dependent on the lift being produced by the airfoil. The invention provides for separately measuring the lift produced by each blade of the rotor and determining the relative magnitude of any discrepancies in lift by comparing the amplitudes of the measured pulses. According to an important feature of the invention, a microphone is used as the pressure sensor, with the microphone, in this application, constituting a low cost dynamic pressure sensor.

Thus, according to one aspect thereof, the present invention relates to a system for determining the aerodynamic unbalance between the propeller or rotor blades of an aircraft, wherein the system comprises: pressure sensor means for separately sensing the pressure pulses produced by each of the blades during the passage thereof by the pressure sensor means and for producing an output signal in accordance therewith; and output means, connected to receive the output of the pressure sensor means, for enabling the relative amplitudes of said pressure pulses to be compared so as to determine the relative magnitudes of any discrepancies between the lift provided by the individual blades.

As stated above, in accordance with an important, and preferred, embodiment of the invention, the pressure sensor means comprises a microphone. Preferably, the system further comprises a low pass filter, connected to the output of the pressure sensor means (e.g., microphone), for filtering the output signal produced by the pressure sensor means to produce a filtered output signal. The low pass filter advantageously has an upper cutoff frequency below the frequency of passage of the blades by or over the pressure sensor means, which is equal to the rotational frequency of the blades divided by the number of blades.

The output means preferably comprises a display means for displaying the filtered output signal produced by the low pass filter in the form of a series of positive and negative peaks corresponding to the pressure pulses produced by the leading and trailing edges of the blades. The magnitude of the distance (overall height) between corresponding positive and negative peaks for an individual blade is proportional to the lift produced by that blade and thus by comparing the corresponding pulse magnitudes for each blade, a determination can be made of the relative lift being provided by each blade.

In accordance with an advantageous embodiment, the system further comprises rotation sensing means for sensing the rotation of the blades and for producing an output signal upon each complete revolution of the blades and the output means comprises a display means responsive to the filtered output signal produced by the low pass filter and to the output signal produced by the rotation sensing means. The display means preferably includes a screen which displays both the filtered output signal produced by the low pass filter and the output signal produced by the rotation sensing means at different levels on the screen along the same axis of the screen so that the output signal produced by the rotation sensing means serves as a reference point for the filtered output signal produced by the low pass filter.

The microphone is advantageously disposed below the plane of rotation of the blades and is spaced from the axis of rotation of the blades an amount equal to about 75% to 80% of the radius of the blades.

In accordance with a further aspect of the invention, a method is provided for determining aerodynamic imbalance between the propeller or rotor blades of an aircraft, wherein the method comprises: reducing the rotational speed of the blades to a level wherein any mass imbalance between the blades does not produce significant vibration; using a microphone to measure the pressure pulses produced by each blade during rotation thereof past the microphone; and comparing the relative magnitudes of the amplitudes of the pressure pulses so produced so as to determine any discrepancies in the lift provided by the individual blades.

Other features and advantages of the invention will be set forth in, or apparent from, the detailed description of preferred embodiments of the invention which follows.

DESCRIPTION OF THE PREFERRED EMBODIMENTS

Figure 1:
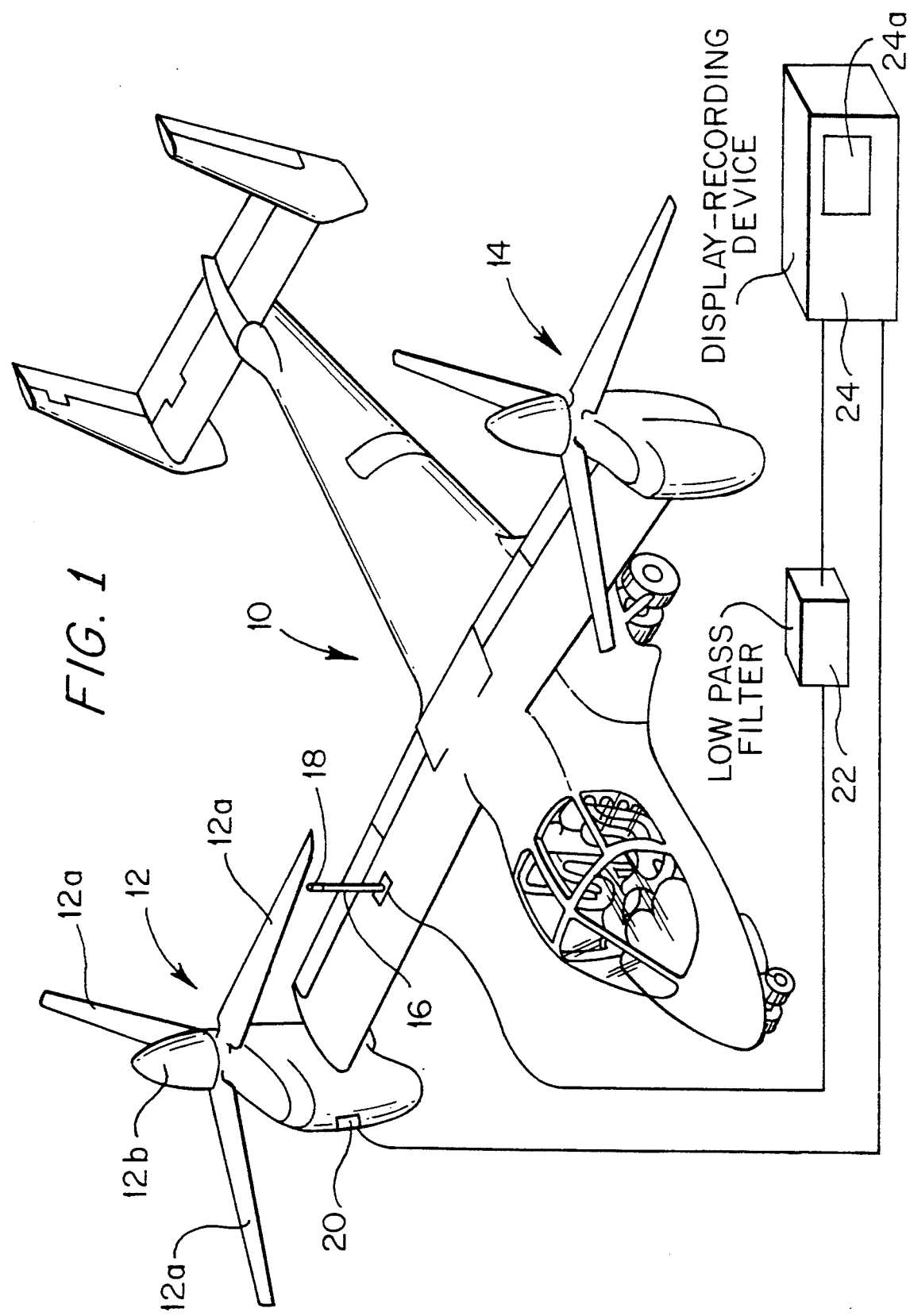
FIG. 1 is a schematic perspective view of the basic components of a preferred embodiment of a system in accordance with the invention for determining aerodynamic imbalance, shown as used with a conventional tilt-rotor aircraft.

Referring to FIG. 1, there is shown a perspective view of a specialized rotor-type aircraft which is generally denoted 10. Although the aircraft 10 is a conventional XV-15 tiltrotor aircraft, it will, of course, be appreciated that the invention is applicable to other helicopter-type aircraft as well as to other rotor and propeller driven aircraft. The tiltrotor aircraft 10 illustrated in FIG. 1 includes a pair of tiltrotors 12 and 14 which can be rotated or tilted to a second position, at right angles to that shown, wherein the rotors (propellers) face forward as in a conventional airplane.

Considering tiltrotor 12 as typical, incorporated therein are a plurality of radially extending blades 12a mounted on a hub 12b and in the position shown, the axis of the hub 12b extends vertically so that the rotor blades 12a lie in a horizontal plane. Again, it will be understood that aircraft 10 is conventional and forms no part of the invention, and thus further description of aircraft 10 is not deemed necessary. Further, as stated, the system of the invention is equally applicable to other rotor and propeller type aircraft.

The system of the embodiment of the invention shown in FIG. 1 includes an upright mount 16 which extends upwardly from a wing of aircraft 10 and which supports a microphone 18. The microphone 18 is located under the rotor blades 12a at a spacing, in the specific embodiment under consideration, of approximately two feet from the plane of rotor blades 12a, and at a distance of approximately three-fourths (75%) of the blade radius, as illustrated. Although the latter, spanwise distance is typically about 75 to 80% of the blade radius, this is generally not critical. In this regard, the location and spacing of the microphone depends, for example, on the type of rotor employed on the aircraft in question. More particularly, it is noted that airplane propeller blades are relatively stiff while helicopter blades are more flexible and this will affect the location of the microphone sensor 18. The spacing from the blades 12a is not critical and is generally chosen so that the amount of filtering required is minimized.

Figure 2A:
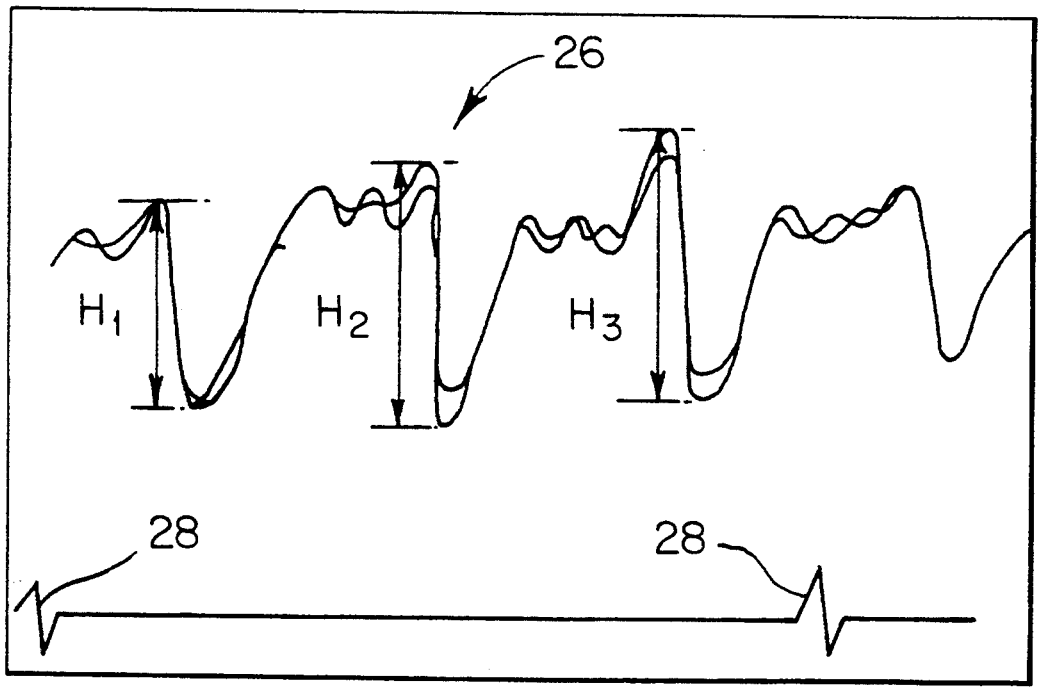
FIGS. 2(a) and 2(b) are representative output waveforms produced by the system of FIG. 1.
Figure 2B:
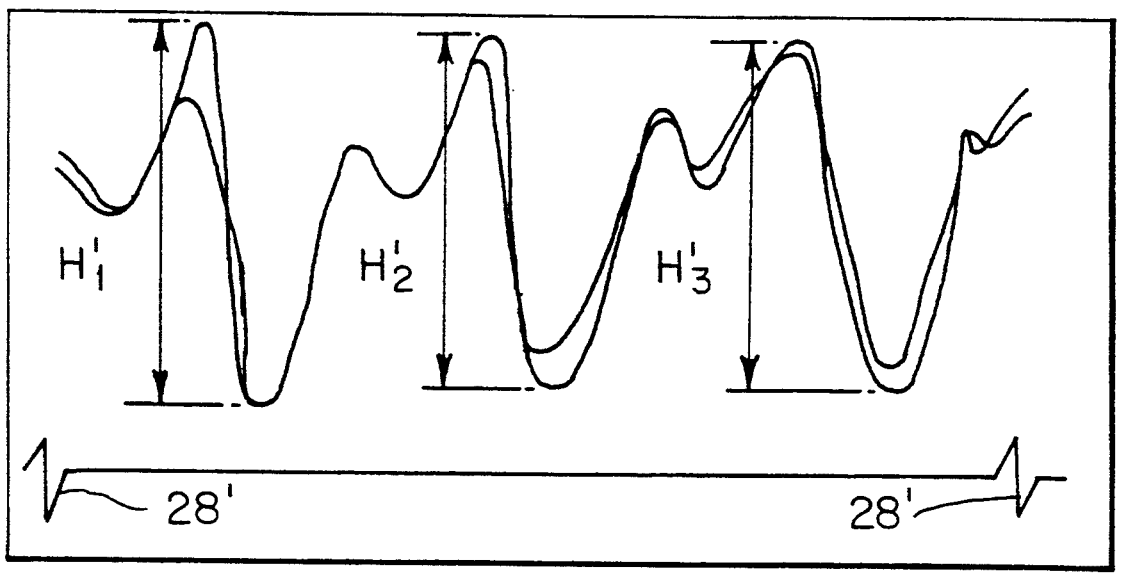

Microphone 18 picks up the sound (pressure waves) produced by rotor blades 12a and converts these into a corresponding electrical output signal. Representative signals are illustrated in FIGS. 2(a) and 2(b) discussed below. Microphone 18 is, as used in this application, a simple low cost dynamic pressure sensor. As discussed above, the system of the invention is based on the fact that an airfoil traveling past a point produces a pressure pulse the magnitude of which is dependent upon the lift being produced by that airfoil. The microphone 18 thus enables a separate measurement to be made of the lift produced by each rotor blade 12a of tiltrotor 12 so that the relative magnitude of any discrepancies in the lift produced by the blades 12a can be determined by comparing the relative amplitudes of the measured electrical signals, i.e., pulses, produced.

An electronic trigger unit 20 is mounted on tiltrotor 12 which produces an output pulse once every rotation (revolution) of the tiltrotor blades 12a. This unit, referred to as an "azimuth blipper," can take a number of different forms and can comprise, for example, a magnetic sensor which produces an output pulse each time a projecting portion of the rotor 12 passes thereby, although optical or microswitch type sensors can also be used. The output of unit 20 provides a reference when comparing the pulses produced by different ones of the blades 12a, as explained below.

A low pass filter 22 is connected to the output of the microphone 18 in which the filter break point, i.e., the passband upper limit or cutoff frequency, is set at less than the blade passage frequency so as to eliminate noise that would otherwise mask, distort or otherwise contaminate the primary data picked up by microphone 18. The blade passage frequency is the rotational frequency of the rotor 12 divided by the number of blades (three in this example).

A display-recording device 24 is connected to receive the outputs of filter 22 and electronic triggering unit 20 and serves to record and display on a display screen 24a the filtered pulse signals produced by microphone 18 for each of the rotor blades 12a so that these pulse signals can be compared.

Referring to FIG. 2(a), typical signals displayed on the display screen 24a of recording-display unit 24 are shown. The filtered signals produced by microphone 18 are displayed on screen 24a at 26 while the azimuth "blips" or reference pulses produced by rotation sensor unit 20 are indicated at 28. The signals shown at 28 correspond to the pressure pulses produced by each of the three rotors 12a as the rotors 12a pass by microphone 18, with the positive pulses corresponding to the signals produced by the leading edges of the blades 12a and the negative pulses corresponding to the signals produced by trailing edges of the blades 12a. The total heights of the pulses for each of the three blades, as measured between the corresponding positive peak and negative valley and indicated at H1, H2 and H3 in FIG. 1, are related to the lift provided by each blade 12a. It will be seen that the heights H1, H2 and H3 are different, meaning that the blades are each providing a different amount of lift and that the aerodynamic loading on the blades is out of balance.

FIG. 2(b) shows a display screen 24a' similar to that shown in FIG. 2(a) although the time between reference pulses or blips 28' is somewhat greater. In FIG. 2(b), the heights of the pressure pulses contained in waveform or signal 26' are substantially equal in height, indicating that the corresponding rotor blades provide substantially the same lift and that the blades are substantially in balance aerodynamically.

It will be understood that where the magnitudes of the pressure pulses are different, as in FIG. 2(a), the aerodynamic loading is adjusted so as to equalize the lift provided by the blades. In general, this is done by selecting one blade as a master or reference, and adjusting the loading on the other two blades by, e.g., effecting balance changes. The recording-display unit 24 would, of course, be used in determining the effect of any adjustments that are made and the process would continue until the lift provided by each blade is substantially the same.

It will be appreciated from the foregoing that the system of the invention provides direct measurement of the lift differences between rotor (propeller) blades which are the cause of "track" problems. With this system, the aerodynamic lift data can be obtained at very low rotor speeds (50% r.p.m.) at which mass unbalance does not cause significant vibration. As a consequence, the basic "track" problem can be separated from the mass imbalance problem and alleviated prior to addressing mass imbalance problems.

Although the present invention has been described relative to specific exemplary embodiments thereof, it will be understood by those skilled in the art that variations and modifications can be effected in these exemplary embodiments without departing from the scope and spirit of the invention.

What is claimed is:

1. A system for determining the aerodynamic unbalance among the blades of an aircraft rotor, said system comprising:
   pressure sensor means for separately sensing the pressure pulse produced by each of the blades during the passage thereof by said pressure sensor means and for producing an output signal in accordance therewith; and
   output means, connected to receive the output of said pressure sensor means, for enabling the relative amplitudes of said pressure pulses to be compared so as to determine the relative magnitudes of any discrepancies between the lift provided by the individual blades.

2. A system as claimed in claim 1 wherein said pressure sensor means comprises a microphone.

3. A system as claimed in claim 2 wherein said system further comprises a low pass filter, connected to the output of said pressure sensor means, for filtering the output signal produced by said pressure sensor means to produce a filtered output signal.

4. A system as claimed in claim 3 wherein said low pass filter has an upper cutoff frequency below the rotational frequency of the blades divided by the number of blades.

5. A system as claimed in claim 3 wherein said output means comprises a display means for displaying the filtered output signal produced by said low pass filter in the form of a series of positive and negative peaks corresponding to the pressure pulses produced by the leading and trailing edges of the blades wherein the magnitude of the distance between corresponding positive and negative peaks for an individual blade is proportional to the lift produced by that blade.

6. A system as claimed in claim 3 wherein said system further comprises rotation sensing means for sensing the rotation of said blades and for producing an output signal upon each complete revolution of said blades and wherein said output means comprises display means responsive to the filtered output signal produced by said low pass filter and to the output signal produced by said rotation sensing means.

7. A system as claimed in claim 5 wherein display means includes a screen which displays both the filtered output signal produced by said low pass filter and the output signal produced by said rotation sensing means at different levels on the screen along the same axis of the screen so that the output signal produced by the rotation sensing means serves as a reference point for the filtered output signal produced by the low pass filter.

8. A system as claimed in claim 2 wherein said microphone is disposed below the plane of rotation of said blades and is spaced from the axis of rotation of said blades an amount equal to about 75% to 80% of the radius of said blades.

9. A system for determining tracking error in the individual blades of a propeller-driven aircraft by determining differences in the aerodynamic loading on said individual blades of the aircraft, said system comprising:
   a microphone disposed relative to the blades during the rotation thereof so as to receive separate pressure pulses produced by each of the blades during the passage thereof by the microphone and so as to produce an output signal responsive to said pressure pulses;
   a low pass filter, connected to the output of said microphone, for filtering the output signal produced by said microphone to produce a filtered output signal, said low pass filter having an upper cut-off frequency below the frequency at which said blades pass by said microphone;
   a sensor for sensing the rotation of said blades and for producing an output signal after each complete revolution of the blades; and
   an output device connected to said low pass filter and said sensor for enabling evaluation of the relative magnitudes of said pressure pulses produced by passage of said blades by said microphone during each complete revolution of said blades, each pressure pulse being representative of the aerodynamic loading on the respective blade.

10. A system as claimed in claim 9 wherein said microphone is located at a distance from the axis of rotation of said blades equal to about 75% to 80% of the radius of the blades.

11. A method for determining aerodynamic imbalance among the individual blades of an aircraft rotor said method comprising:
reducing the rotational speed of said blades to a level wherein any mass imbalance between the blades does not produce significant vibration;
using a microphone to measure the pressure pulses produced by each blade during rotation thereof past the microphone; and
comparing the relative magnitudes of the amplitudes of the pressure pulses so produced so as to determine any discrepancies in the lift provided by each blade.

12. A method as claimed in claim 11 further comprising low pass filtering the output of said microphone.

13. A method as claimed in claim 12 wherein the upper cutoff frequency of said low pass filter is set to be below the frequency of passage of the blades by said microphone.

14. A method as claimed in claim 11 wherein said method further comprises generating a signal after each complete revolution of said blades and using said signal as a time reference in comparing the pressure pulses.

* * * * *